(12) United States Patent
Li

(10) Patent No.: US 7,871,189 B2
(45) Date of Patent: Jan. 18, 2011

(54) WARNING LAMP AND HANDLEBAR ASSEMBLY FOR BICYCLE

(76) Inventor: Jin-Cang Li, 129, Sec. 4, Jhanglu Rd., Fusing Township, Changhua County (TW)

( * ) Notice: Subject to any disclaimer, the term of this patent is extended or adjusted under 35 U.S.C. 154(b) by 340 days.

(21) Appl. No.: 12/206,923

(22) Filed: Sep. 9, 2008

(65) Prior Publication Data

US 2010/0061112 A1    Mar. 11, 2010

(51) Int. Cl.
*B62J 33/00* (2006.01)
(52) U.S. Cl. ......................... 362/474; 362/546
(58) Field of Classification Search ................. 362/459, 362/473, 474, 546
See application file for complete search history.

(56) References Cited

U.S. PATENT DOCUMENTS

| | | | | |
|---|---|---|---|---|
| 2,469,944 A | * | 5/1949 | Bauters | 340/432 |
| 4,779,169 A | * | 10/1988 | Cruze | 362/474 |
| 4,875,142 A | * | 10/1989 | Spector | 362/474 |
| 5,247,431 A | * | 9/1993 | Liu | 362/474 |

* cited by examiner

*Primary Examiner*—David V Bruce
(74) *Attorney, Agent, or Firm*—Alan Kamrath; Kamrath & Associates PA (57) ABSTRACT

A warning lamp and handlebar assembly for a bicycle includes a handlebar, a warning lamp mounted on a distal end of the handlebar, and a clamping body mounted between the handlebar and the warning lamp to attach the warning lamp to the handlebar. Thus, the warning lamp is attached to the handlebar by clamping connection of the clamping body to provide a lighting and warning effect. In addition, the warning lamp and the handlebar are clamped by the clamping body so that the warning lamp is attached to the handlebar solidly and stably. Further, the warning lamp is locked onto and unlocked from the handlebar by tightening and loosening the clamping body, so that the warning lamp is mounted on and detached from the handlebar easily and quickly.

18 Claims, 6 Drawing Sheets

WARNING LAMP AND HANDLEBAR ASSEMBLY FOR BICYCLE

BACKGROUND OF THE INVENTION

1. Field of the Invention

The present invention relates to a lighting and warning device and, more particularly, to a warning lamp and handlebar assembly for a bicycle.

2. Description of the Related Art

A conventional warning lamp for a bicycle is often mounted on the front side or rear side of the bicycle to provide a lighting and warning effect during a forward travel of the bicycle at the night. However, the warning lamp is not mounted on the handlebar of the bicycle to provide a lighting and warning effect when the bicycle is turned rightward or leftward at the night, thereby limiting the versatility of the warning lamp.

BRIEF SUMMARY OF THE INVENTION

In accordance with the present invention, there is provided a warning lamp and handlebar assembly, comprising a handlebar, a warning lamp mounted on a distal end of the handlebar, and a clamping body mounted between the handlebar and the warning lamp to attach the warning lamp to the handlebar.

The primary objective of the present invention is to provide a warning lamp and handlebar assembly for a bicycle, wherein the warning lamp is attached to the handlebar by clamping connection of the clamping body to provide a lighting and warning effect.

Another objective of the present invention is to provide a warning lamp and handlebar assembly for a bicycle, wherein the body portion 10a of the housing is inserted into the handlebar, and the clamping body is compressed to lock the housing of the warning lamp onto the handlebar so that the warning lamp is mounted on the handlebar easily and quickly.

A further objective of the present invention is to provide a warning lamp and handlebar assembly for a bicycle, wherein the warning lamp and the handlebar are clamped by the clamping body so that the warning lamp is attached to the handlebar solidly and stably.

A further objective of the present invention is to provide a warning lamp and handlebar assembly for a bicycle, wherein the warning lamp is locked onto and unlocked from the handlebar by tightening and loosening the clamping body, so that the warning lamp is mounted on and detached from the handlebar easily and quickly.

A further objective of the present invention is to provide a warning lamp and handlebar assembly for a bicycle, wherein a user only needs to tighten or loosen the clamping body to mount the warning lamp on the handlebar or detach the warning lamp from the handlebar to prevent the warning lamp and the handlebar from being rubbed or worn out due to an excessive force, thereby enhancing the lifetime of the warning lamp and the handlebar.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-4, a warning lamp and handlebar assembly for a bicycle in accordance with the first preferred embodiment of the present invention comprises a handlebar 30, a warning lamp 10 mounted on a distal end of the handlebar 30, and a clamping body 20 mounted between the handlebar 30 and the warning lamp 10 to attach the warning lamp 10 to the handlebar 30.

The warning lamp 10 includes a housing 101 and a warning unit 102 mounted on the housing 101.

The housing 101 of the warning lamp 10 includes a mounting portion 11 mounted between the handlebar 30 and the clamping body 20. The housing 101 of the warning lamp 10 further includes a body portion 10a and a head portion 10b connected with the body portion 10a. The body portion 10a of the housing 101 is inserted into an end opening 31 of the handlebar 30, and the head portion 10b of the housing 101 protrudes outwardly from the end opening 31 of the handlebar 30. The mounting portion 11 of the housing 101 has an annular shape and extends axially from an inner side 12 of the head portion 10b to surround the body portion 10a, and an annular chamber 14 is defined between the mounting portion 11 of the housing 101 and an outer wall 13 of the body portion 10a to allow entrance of the distal end of the handlebar 30. Preferably, the distal end of the handlebar 30 is inserted into the annular chamber 14 of the housing 101 and abuts the inner side 12 of the head portion 10b. The head portion 10b of the housing 101 has a central portion provided with a through hole 16.

The warning unit 102 of the warning lamp 10 is operated to produce a lighting and warning effect. The warning unit 102 of the warning lamp 10 is mounted in the body portion 10a of the housing 101 and includes a circuit board 15, at least one battery 151 mounted on the circuit board 15, a contact switch 152 connected to the circuit board 15, a holder 153 connected to the contact switch 152, a light emitting diode (LED) 155 mounted on the holder 153 and protruding outwardly from the through hole 16 of the head portion 10b of the housing 101, and an elastic restoring member 154 biased between the contact switch 152 and the holder 153. Thus, when the light emitting diode 155 is pressed toward the contact switch 152, the contact switch 152 is started to operate the warning unit 102 of the warning lamp 10.

The clamping body 20 is mounted on the mounting portion 11 of the housing 101 of the warning lamp 10 and has an inner wall 25 compressing the mounting portion 11 of the housing 101 of the warning lamp 10 to lock the mounting portion 11 of the housing 101 of the warning lamp 10 onto an outer wall 32 of the handlebar 30. Preferably, the clamping body 20 has a substantially C-shaped profile and has two opposite sides and a slit 21 defined between the two opposite sides of the clamping body 20. The warning lamp and handlebar assembly further comprises at least one locking bolt 24 extending through the two opposite sides of the clamping body 20 to compress the clamping body 20 toward the mounting portion 11 of the housing 101 of the warning lamp 10 and the distal end of the handlebar 30. One of the two opposite sides of the clamping body 20 is provided with at least one through bore 22 to allow passage of the at least one locking bolt 24, and the other one of the two opposite sides of the clamping body 20 is provided with at least one screw bore 23 screwed onto the at least one locking bolt 24.

Thus, when the clamping body 20 is compressed by rotation of the locking bolt 24 relative to the clamping body 20, the inner wall 25 of the clamping body 20 compresses the mounting portion 11 of the housing 101 of the warning lamp 10 to compress the outer wall 32 of the handlebar 30 so as to lock the housing 101 of the warning lamp 10 onto the handlebar 30. Preferably, the clamping body 20 has an outer end portion 26 abutting the inner side 12 of the head portion 10b.

In assembly, the clamping body 20 is mounted on the mounting portion 11 of the housing 101 of the warning lamp 10, with the outer end portion 26 of the clamping body 20 abutting the inner side 12 of the head portion 10b. Then, the body portion 10a of the housing 101 is inserted into the end opening 31 of the handlebar 30, so that the distal end of the handlebar 30 is inserted into the annular chamber 14 of the housing 101 and abuts the inner side 12 of the head portion 10b. Finally, the clamping body 20 is compressed by rotation of the locking bolt 24 relative to the clamping body 20, so that the mounting portion 11 of the housing 101 of the warning lamp 10 is compressed by the inner wall 25 of the clamping body 20 to compress the outer wall 32 of the handlebar 30 so as to lock the housing 101 of the warning lamp 10 onto the handlebar 30.

Figure 5:
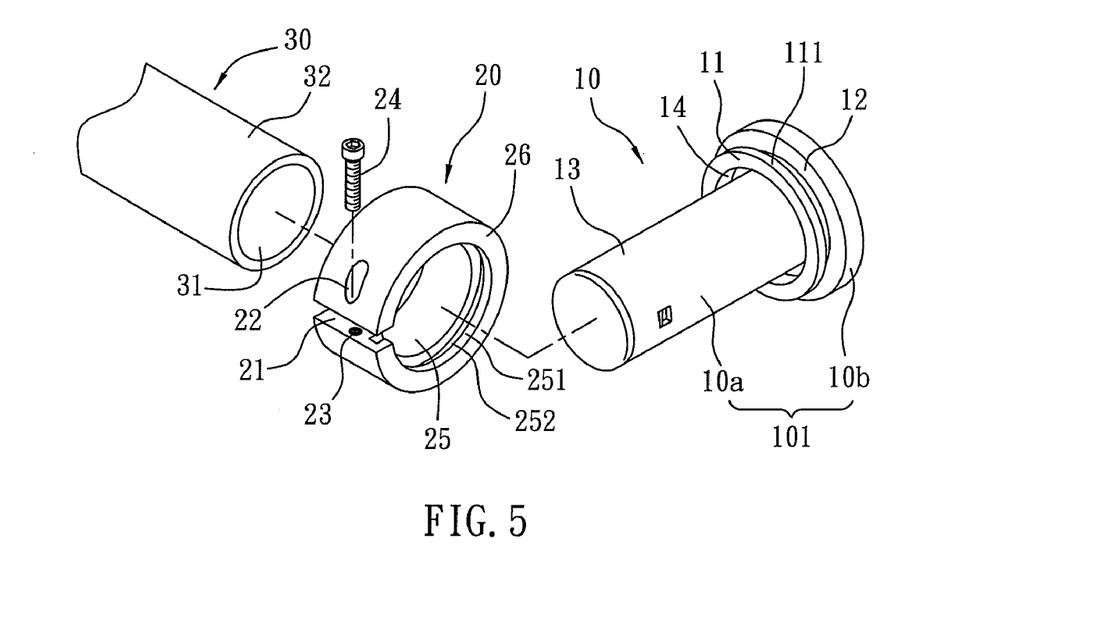
FIG. 5 is an exploded perspective view of a warning lamp and handlebar assembly for a bicycle in accordance with the second preferred embodiment of the present invention.
Figure 6:
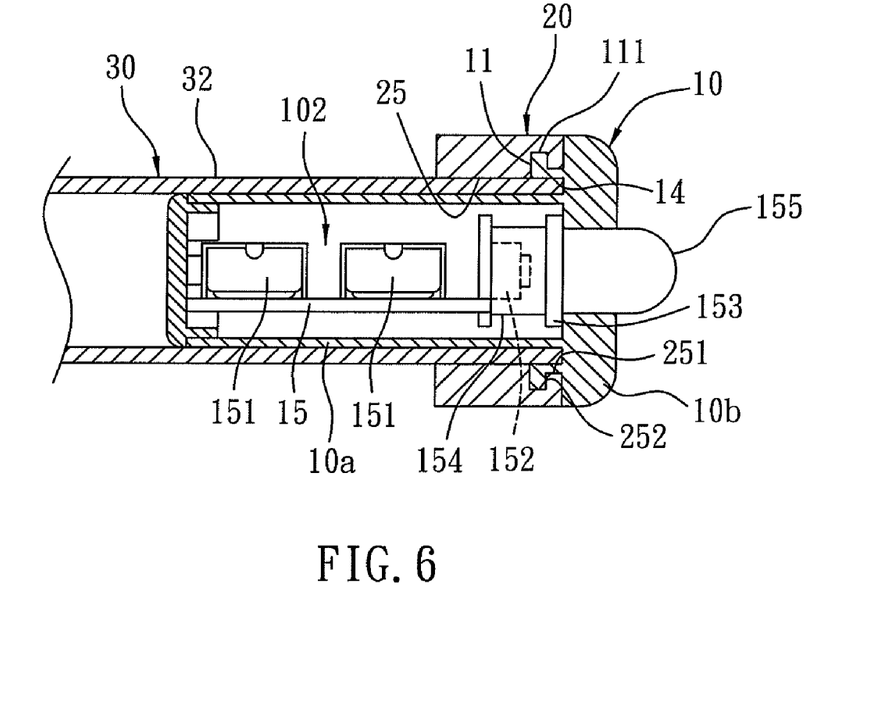
FIG. 6 is a front cross-sectional assembly view of the warning lamp and handlebar assembly for a bicycle as shown in FIG. 5.

Referring to FIGS. 5 and 6, a warning lamp and handlebar assembly for a bicycle in accordance with the second preferred embodiment of the present invention is similar to that of the first preferred embodiment of the present invention, and the difference therebetween is described as follows.

The clamping body 20 is partially mounted on the mounting portion 11 of the housing 101 of the warning lamp 10 and partially mounted on the handlebar 30. The clamping body 20 has an inner wall 25 compressing the outer wall 32 of the handlebar 30 directly and locally. The mounting portion 11 of the housing 101 has an outer wall provided with an annular retaining flange 111. The inner wall 25 of the clamping body 20 has an enlarged end portion 251 to allow passage of the retaining flange 111 of the mounting portion 11 of the housing 101. The enlarged end portion 251 of the inner wall 25 of the clamping body 20 has a diameter greater than that of the inner wall 25 of the clamping body 20 and is provided with an annular retaining groove 252 locked onto the retaining flange 111 of the mounting portion 11 of the housing 101.

Thus, when the clamping body 20 is compressed by rotation of the locking bolt 24 relative to the clamping body 20, the inner wall 25 of the clamping body 20 compresses the outer wall 32 of the handlebar 30, and the retaining groove 252 of the clamping body 20 is locked onto the retaining flange 111 of the mounting portion 11 of the housing 101, so that the housing 101, the handlebar 30 and the clamping body 20 are combined together closely.

Figure 7:
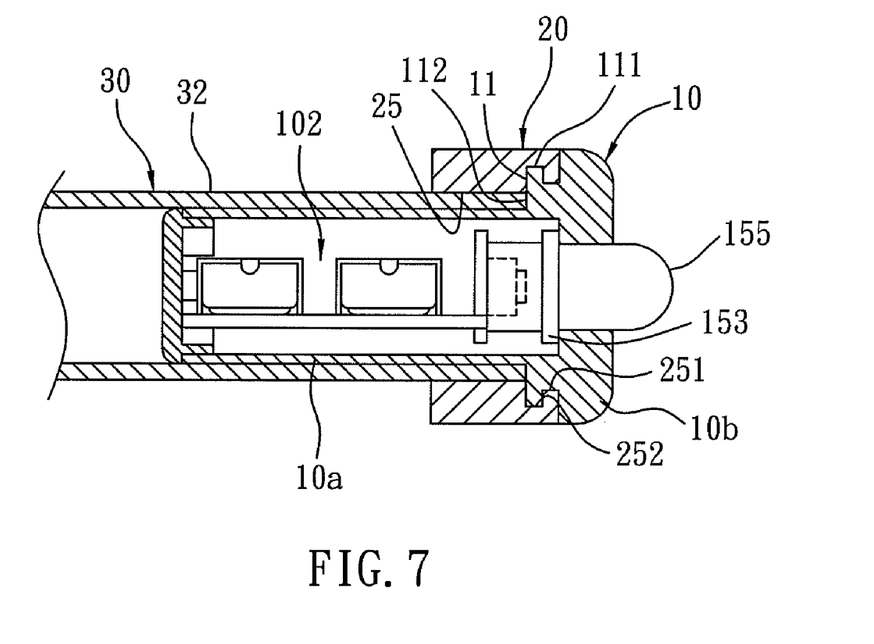
FIG. 7 is a front cross-sectional assembly view of a warning lamp and handlebar assembly for a bicycle in accordance with the third preferred embodiment of the present invention.

Referring to FIG. 7, a warning lamp and handlebar assembly for a bicycle in accordance with the third preferred embodiment of the present invention is similar to that of the second preferred embodiment of the present invention, and the difference therebetween is described as follows.

The annular chamber 14 between the mounting portion 11 of the housing 101 and the outer wall 13 of the body portion 10a is undefined. The mounting portion 11 of the housing 101 has a solid end face 112, and the distal end of the handlebar 30 directly abuts the end face 112 of the mounting portion 11 of the housing 101.

Figure 8:
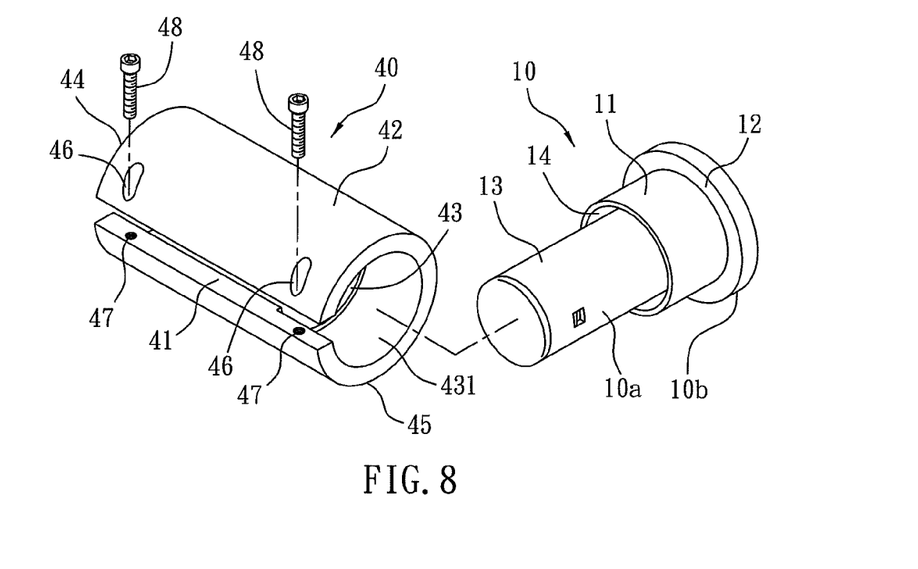
FIG. 8 is an exploded perspective view of a warning lamp and handlebar assembly for a bicycle in accordance with the fourth preferred embodiment of the present invention.

Referring to FIG. 8, a warning lamp and handlebar assembly for a bicycle in accordance with the fourth preferred embodiment of the present invention is similar to that of the first preferred embodiment of the present invention, and the difference therebetween is described as follows.

Figure 1:
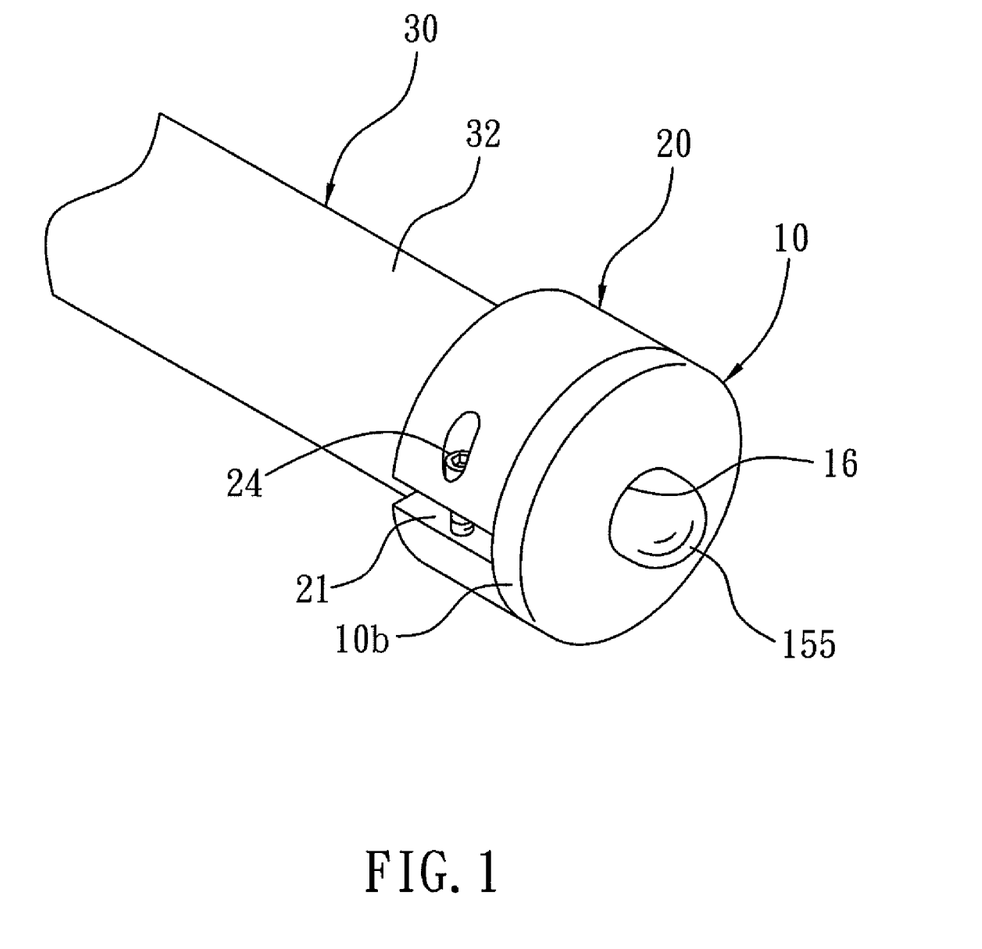
FIG. 1 is a perspective view of a warning lamp and handlebar assembly for a bicycle in accordance with the first preferred embodiment of the present invention.
Figure 2:
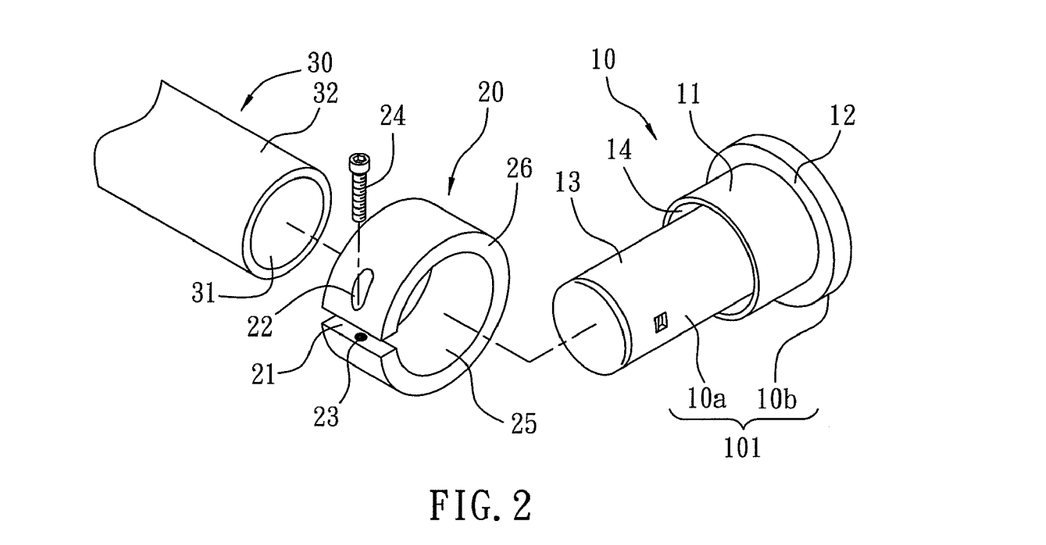
FIG. 2 is an exploded perspective view of the warning lamp and handlebar assembly for a bicycle as shown in FIG. 1.
Figure 3:
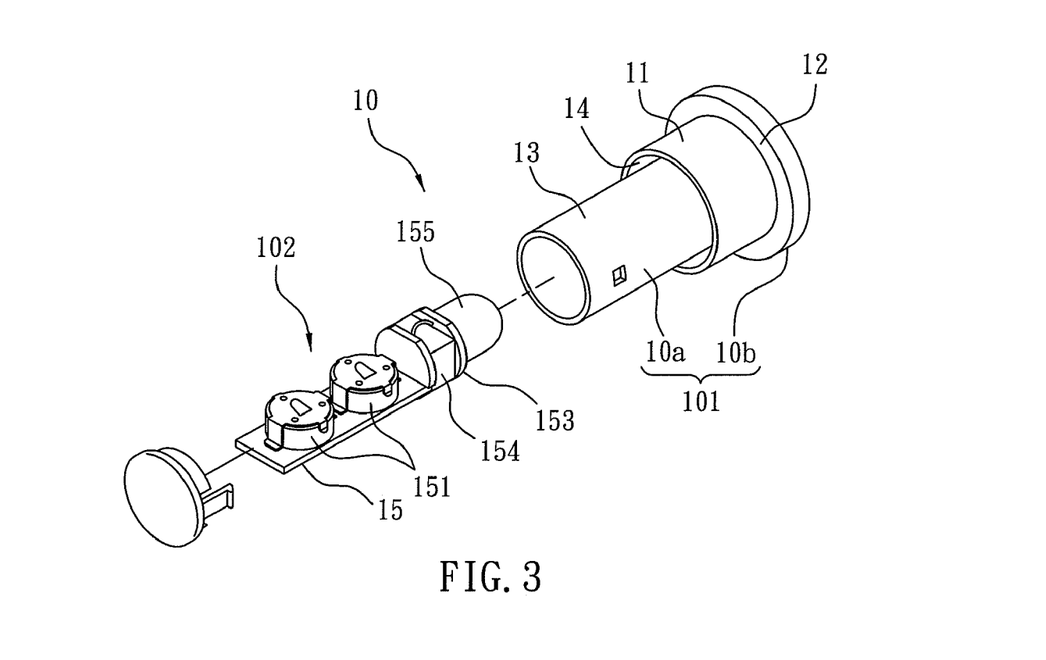
FIG. 3 is a partially exploded perspective view of the warning lamp and handlebar assembly for a bicycle as shown in FIG. 2.
Figure 4:
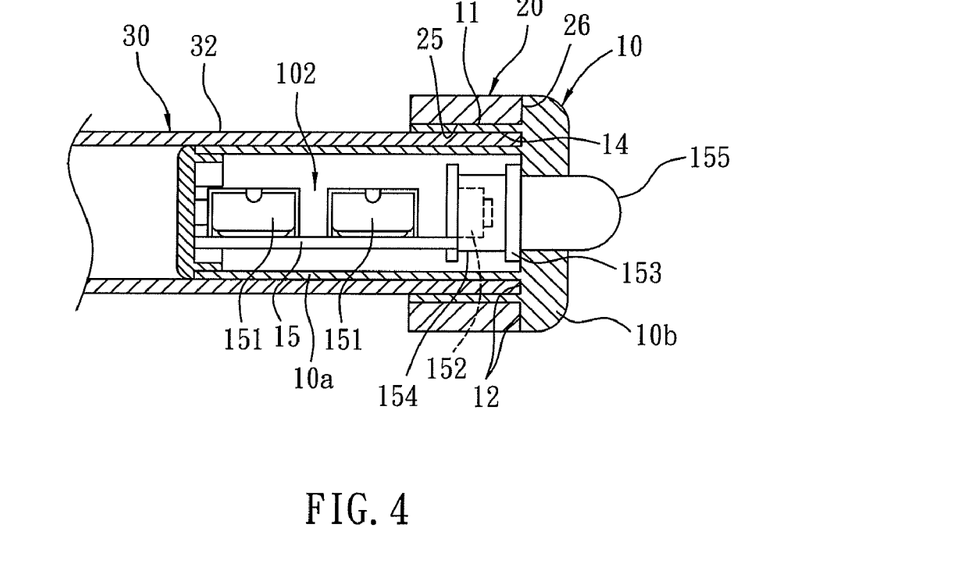
FIG. 4 is a front cross-sectional view of the warning lamp and handlebar assembly for a bicycle as shown in FIG. 1.

As shown in FIGS. 2 and 8, the clamping body 40 is partially mounted on the mounting portion 11 of the housing 101 of the warning lamp 10 and partially mounted on the handlebar 30. The clamping body 40 has an inner wall 43 compressing the outer wall 32 of the handlebar 30. The inner wall 43 of the clamping body 40 has an enlarged end portion 431 compressing the mounting portion 11 of the housing 101 of the warning lamp 10. The enlarged end portion 431 of the clamping body 40 has a diameter greater than that of the inner wall 43 of the clamping body 40 to receive the mounting portion 11 of the housing 101 of the warning lamp 10.

The clamping body 40 is made of a hollow hard material. The clamping body 40 has a substantially elongate C-shaped profile and has two opposite sides and an axially extending elongate slit 41 defined between the two opposite sides of the clamping body 40. The slit 41 of the clamping body 40 extends axially from an inner end 44 to an outer end 45 of the clamping body 40 and extends radially from the inner wall 43 to an outer wall 42 of the clamping body 40. The warning lamp and handlebar assembly further comprises two locking bolts 48 extending through the two opposite sides of the clamping body 40 to compress the clamping body 40 toward the mounting portion 11 of the housing 101 of the warning lamp 10 and the distal end of the handlebar 30. One of the two opposite sides of the clamping body 40 is provided with two through bores 46 to allow passage of the two locking bolts 48, and the other one of the two opposite sides of the clamping body 40 is provided with two screw bores 47 screwed onto the two locking bolts 48.

Thus, when the clamping body 40 is compressed by rotation of the locking bolts 48 relative to the clamping body 40, the inner wall 43 of the clamping body 40 compresses the outer wall 32 of the handlebar 30, and the enlarged end portion 431 of the clamping body 40 compresses the mounting portion 11 of the housing 101 of the warning lamp 10, so that the housing 101, the handlebar 30 and the clamping body 40 are combined together closely.

Figure 9:
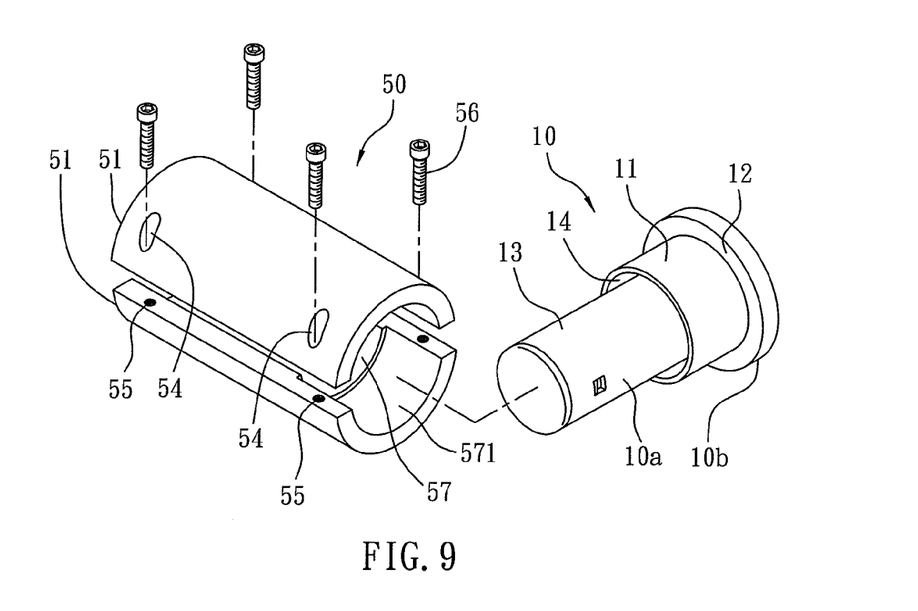
FIG. 9 is an exploded perspective view of a warning lamp and handlebar assembly for a bicycle in accordance with the fifth preferred embodiment of the present invention.

Referring to FIG. 9, a warning lamp and handlebar assembly for a bicycle in accordance with the fifth preferred embodiment of the present invention is similar to that of the fourth preferred embodiment of the present invention, and the difference therebetween is described as follows.

As shown in FIGS. 2 and 9, the clamping body 50 is partially mounted on the mounting portion 11 of the housing 101 of the warning lamp 10 and partially mounted on the handlebar 30. The clamping body 50 has an inner wall 57 compressing the outer wall 32 of the handlebar 30. The inner wall 57 of the clamping body 50 has an enlarged end portion 571 compressing the mounting portion 11 of the housing 101 of the warning lamp 10. The enlarged end portion 571 of the clamping body 50 has a diameter greater than that of the inner wall 57 of the clamping body 50 to receive the mounting portion 11 of the housing 101 of the warning lamp 10.

The clamping body 50 consists of two substantially semi-tubular shells 51 each of which is made of a hollow hard material. The warning lamp and handlebar assembly further comprises a plurality of locking bolts 56 extending through two opposite sides of each of the two shells 51 of the clamping body 50 to compress the two shells 51 of the clamping body 50 toward the mounting portion 11 of the housing 101 of the warning lamp 10 and the distal end of the handlebar 30. Each of the two opposite sides of one of the two shells 51 of the clamping body 50 is provided with two through bores 54 to allow passage of the locking bolts 56, and each of the two opposite sides of the other one of the two shells 51 of the clamping body 50 is provided with two screw bores 55 screwed onto the two locking bolts 56.

Thus, when the two shells 51 of the clamping body 50 are compressed by rotation of the locking bolts 56 relative to the clamping body 50, the inner wall 57 of the clamping body 50 compresses the outer wall 32 of the handlebar 30, and the enlarged end portion 571 of the clamping body 40 compresses the mounting portion 11 of the housing 101 of the warning lamp 10, so that the housing 101, the handlebar 30 and the clamping body 50 are combined together closely.

Figure 10:
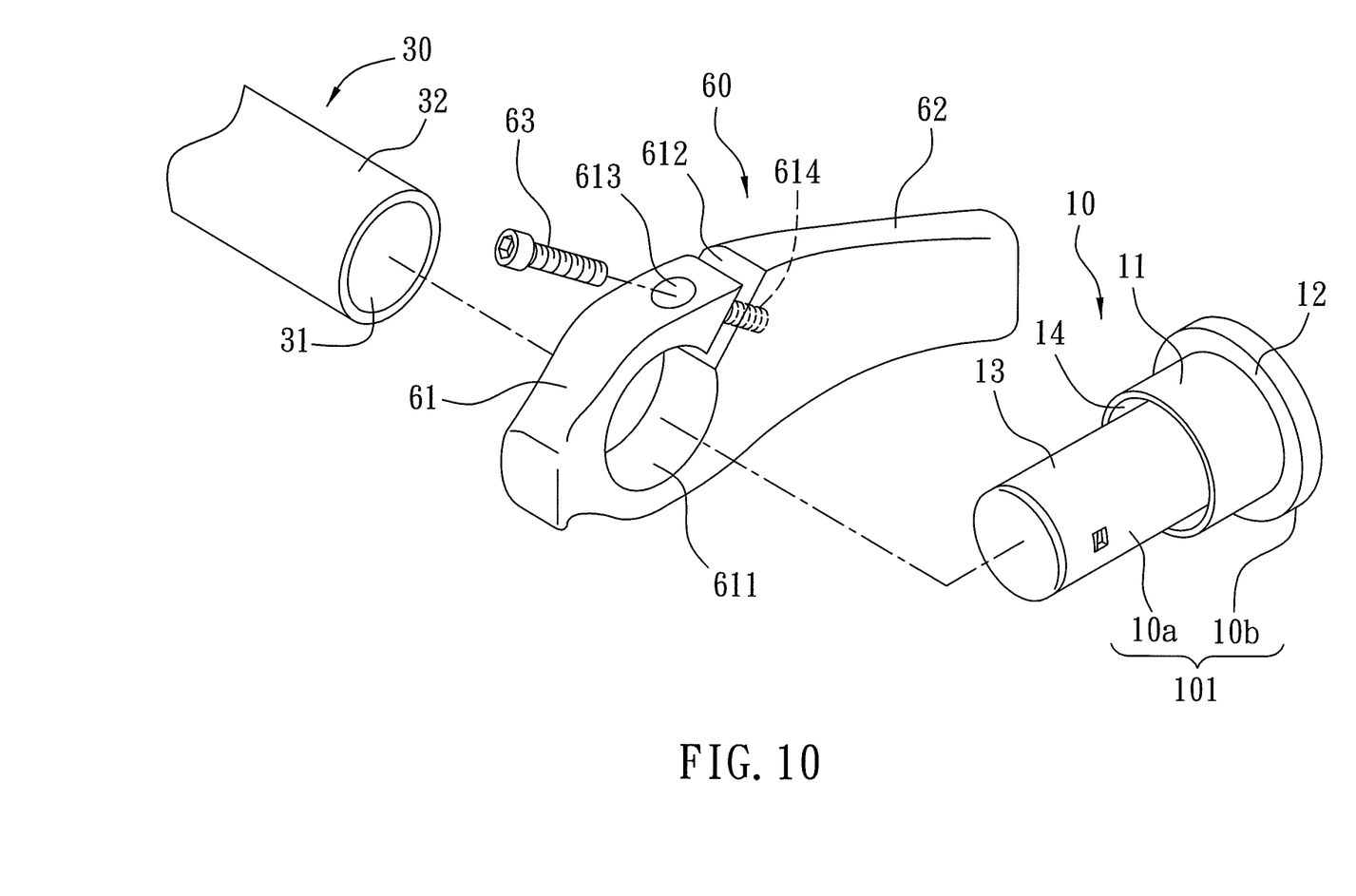
FIG. 10 is an exploded perspective view of a warning lamp and handlebar assembly for a bicycle in accordance with the sixth preferred embodiment of the present invention.

Referring to FIG. 10, a warning lamp and handlebar assembly for a bicycle in accordance with the sixth preferred embodiment of the present invention is similar to that of the fifth preferred embodiment of the present invention, and the difference therebetween is described as follows.

As shown in FIGS. 2 and 10, the clamping body 60 functions as a secondary handlebar. The clamping body 60 is mounted on the mounting portion 11 of the housing 101 of the warning lamp 10 and has a clamping portion 61 having an inner wall 611 compressing the mounting portion 11 of the housing 101 of the warning lamp 10 to lock the mounting portion 11 of the housing 101 of the warning lamp 10 onto an outer wall 32 of the handlebar 30. The clamping body 60 has an elongate grip portion 62 extending outwardly from the clamping portion 61. Preferably, the clamping portion 61 of the clamping body 60 has a substantially C-shaped profile and has two opposite sides and a slit 612 defined between the two opposite sides of the clamping portion 61 of the clamping body 60. The warning lamp and handlebar assembly further comprises at least one locking bolt 63 extending through the two opposite sides of the clamping portion 61 of the clamping body 60 to compress the clamping portion 61 of the clamping body 60 toward the mounting portion 11 of the housing 101 of the warning lamp 10 and the distal end of the handlebar 30. One of the two opposite sides of the clamping portion 61 of the clamping body 60 is provided with at least one through bore 613 to allow passage of the at least one locking bolt 63, and the other one of the two opposite sides of the clamping portion 61 of the clamping body 60 is provided with at least one screw bore 614 screwed onto the at least one locking bolt 63.

Thus, when the clamping portion 61 of the clamping body 60 is compressed by rotation of the locking bolt 63 relative to the clamping portion 61 of the clamping body 60, the inner wall 61 of the clamping portion 61 of the clamping body 60 compresses the mounting portion 11 of the housing 101 of the warning lamp 10 to compress the outer wall 32 of the handlebar 30 so as to lock the housing 101 of the warning lamp 10 onto the handlebar 30.

Accordingly, the warning lamp 10 is attached to the handlebar 30 by clamping connection of the clamping body to provide a lighting and warning effect. In addition, the body portion 10a of the housing 101 is inserted into the handlebar 30, and the clamping body is compressed to lock the housing 101 of the warning lamp 10 onto the handlebar 30 so that the warning lamp 10 is mounted on the handlebar 30 easily and quickly. Further, the warning lamp 10 and the handlebar 30 are clamped by the clamping body so that the warning lamp 10 is attached to the handlebar 30 solidly and stably. Further, the warning lamp 10 is locked onto and unlocked from the handlebar 30 by tightening and loosening the clamping body, so that the warning lamp 10 is mounted on and detached from the handlebar 30 easily and quickly. Further, a user only needs to tighten or loosen the clamping body to mount the warning lamp 10 on the handlebar 30 or detach the warning lamp 10 from the handlebar 30 to prevent the warning lamp 10 and the handlebar 30 from being rubbed or worn out due to an excessive force, thereby enhancing the lifetime of the warning lamp 10 and the handlebar 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A warning lamp and handlebar assembly, comprising:
   a handlebar;
   a warning lamp mounted on a distal end of the handlebar;
   a clamping body mounted between the handlebar and the warning lamp to attach the warning lamp to the handlebar.

2. The warning lamp and handlebar assembly of claim 1, wherein
   the warning lamp includes a housing and a warning unit mounted on the housing;
   the housing of the warning lamp includes a mounting portion mounted between the handlebar and the clamping body;
   the warning unit of the warning lamp is operated to produce a lighting and warning effect.

3. The warning lamp and handlebar assembly of claim 2, wherein
   the clamping body is mounted on the mounting portion of the housing of the warning lamp and has an inner wall compressing the mounting portion of the housing of the warning lamp to compress an outer wall of the handlebar to lock the mounting portion of the housing of the warning lamp onto the outer wall of the handlebar.

4. The warning lamp and handlebar assembly of claim 3, wherein
   the clamping body has a substantially C-shaped profile and has two opposite sides and a slit defined between the two opposite sides of the clamping body;
   the warning lamp and handlebar assembly further comprises at least one locking bolt extending through the two opposite sides of the clamping body to compress the clamping body toward the mounting portion of the housing of the warning lamp and the distal end of the handlebar.

5. The warning lamp and handlebar assembly of claim 4, wherein one of the two opposite sides of the clamping body is provided with at least one through bore to allow passage of the at least one locking bolt;

the other one of the two opposite sides of the clamping body is provided with at least one screw bore screwed onto the at least one locking bolt.

6. The warning lamp and handlebar assembly of claim 2, wherein the clamping body is partially mounted on the mounting portion of the housing of the warning lamp and partially mounted on the handlebar;

the clamping body has an inner wall compressing an outer wall of the handlebar directly and locally;

the mounting portion of the housing has an outer wall provided with an annular retaining flange;

the inner wall of the clamping body has an enlarged end portion to allow passage of the retaining flange of the mounting portion of the housing;

the enlarged end portion of the inner wall of the clamping body is provided with an annular retaining groove locked onto the retaining flange of the mounting portion of the housing.

7. The warning lamp and handlebar assembly of claim 6, wherein the clamping body has a substantially C-shaped profile and has two opposite sides and a slit defined between the two opposite sides of the clamping body;

the warning lamp and handlebar assembly further comprises at least one locking bolt extending through the two opposite sides of the clamping body to compress the clamping body toward the mounting portion of the housing of the warning lamp and the distal end of the handlebar.

8. The warning lamp and handlebar assembly of claim 6, wherein the enlarged end portion of the inner wall of the clamping body has a diameter greater than that of the inner wall of the clamping body.

9. The warning lamp and handlebar assembly of claim 2, wherein the clamping body is partially mounted on the mounting portion of the housing of the warning lamp and partially mounted on the handlebar;

the clamping body has an inner wall compressing the outer wall of the handlebar;

the inner wall of the clamping body has an enlarged end portion compressing the mounting portion of the housing of the warning lamp.

10. The warning lamp and handlebar assembly of claim 9, wherein the clamping body is made of a hollow hard material;

the clamping body has a substantially elongate C-shaped profile and has two opposite sides and an axially extending elongate slit defined between the two opposite sides of the clamping body;

the warning lamp and handlebar assembly further comprises at least one locking bolt extending through the two opposite sides of the clamping body to compress the clamping body toward the mounting portion of the housing of the warning lamp and the distal end of the handlebar.

11. The warning lamp and handlebar assembly of claim 10, wherein the enlarged end portion of the clamping body has a diameter greater than that of the inner wall of the clamping body to receive the mounting portion of the housing of the warning lamp;

the slit of the clamping body extends axially from an inner end to an outer end of the clamping body and extends radially from the inner wall to an outer wall of the clamping body.

12. The warning lamp and handlebar assembly of claim 9, wherein the clamping body consists of two substantially semi-tubular shells each of which is made of a hollow hard material;

the warning lamp and handlebar assembly further comprises a plurality of locking bolts extending through two opposite sides of each of the two shells of the clamping body to compress the two shells of the clamping body toward the mounting portion of the housing of the warning lamp and the distal end of the handlebar.

13. The warning lamp and handlebar assembly of claim 2, wherein the clamping body functions as a secondary handlebar;

the clamping body is mounted on the mounting portion of the housing of the warning lamp and has a clamping portion having an inner wall compressing the mounting portion of the housing of the warning lamp to lock the mounting portion of the housing of the warning lamp onto an outer wall of the handlebar;

the clamping body has an elongate grip portion extending outwardly from the clamping portion;

the clamping portion of the clamping body has a substantially C-shaped profile and has two opposite sides and a slit defined between the two opposite sides of the clamping portion of the clamping body;

the warning lamp and handlebar assembly further comprises at least one locking bolt extending through the two opposite sides of the clamping portion of the clamping body to compress the clamping portion of the clamping body toward the mounting portion of the housing of the warning lamp and the distal end of the handlebar.

14. The warning lamp and handlebar assembly of claim 2, wherein the housing of the warning lamp further includes a body portion and a head portion connected with the body portion;

the body portion of the housing is inserted into an end opening of the handlebar;

the head portion of the housing protrudes outwardly from the end opening of the handlebar;

the mounting portion of the housing extends axially from an inner side of the head portion to surround the body portion.

15. The warning lamp and handlebar assembly of claim 14, wherein the mounting portion of the housing has an annular shape;

the housing has an annular chamber defined between the mounting portion of the housing and an outer wall of the body portion to allow entrance of the distal end of the handlebar.

the distal end of the handlebar is inserted into the annular chamber of the housing and abuts an inner side of the head portion.

16. The warning lamp and handlebar assembly of claim 14, wherein the clamping body has an outer end portion abutting an inner side of the head portion.

17. The warning lamp and handlebar assembly of claim 14, wherein the mounting portion of the housing has a solid end face;

the distal end of the handlebar directly abuts the end face of the mounting portion of the housing.

18. The warning lamp and handlebar assembly of claim 14, wherein the head portion of the housing has a central portion provided with a through hole;

the warning unit of the warning lamp is mounted in the body portion of the housing and includes a circuit board, at least one battery mounted on the circuit board, a contact switch connected to the circuit board, a holder connected to the contact switch, a light emitting diode mounted on the holder and protruding outwardly from the through hole of the head portion of the housing, and an elastic restoring member biased between the contact switch and the holder.

\* \* \* \* \*